US012596037B2

(12) United States Patent
Legendre

(10) Patent No.: US 12,596,037 B2
(45) Date of Patent: Apr. 7, 2026

(54) THERMOCHROMIC PELLET FOR THERMOCHROMIC INDICATOR, THERMOCHROMIC INDICATOR, AND ASSOCIATED ELECTRICAL UNIT AND ELECTRICAL SWITCHBOARD

(71) Applicant: Schneider Electric Industries SAS, Rueil Malmaison (FR)

(72) Inventor: Philippe Legendre, Fontaine (FR)

(73) Assignee: Schneider Electric Industries SAS, Rueil Malmaison (FR)

( * ) Notice: Subject to any disclaimer, the term of this patent is extended or adjusted under 35 U.S.C. 154(b) by 644 days.

(21) Appl. No.: 18/080,940

(22) Filed: Dec. 14, 2022

(65) Prior Publication Data

US 2023/0194360 A1     Jun. 22, 2023

(30) Foreign Application Priority Data

Dec. 16, 2021     (FR) ...................................... 2113701

(51) Int. Cl.
*G01K 11/14*          (2006.01)
*G01K 3/00*           (2006.01)

(52) U.S. Cl.
CPC .............. *G01K 11/14* (2013.01); *G01K 3/005* (2013.01)

(58) Field of Classification Search
CPC .......... G01K 11/14; G01K 3/005; G01K 1/14; G01K 3/04; G01K 11/12; G01K 11/16; G01K 11/18; G01K 1/02; G01K 2217/00; H01H 71/04; H01H 9/16; H01H 50/08; H01H 50/14; H01H 71/08; H02B 1/015; H01R 13/46

USPC ......................................................... 116/216
See application file for complete search history.

(56) References Cited

U.S. PATENT DOCUMENTS

2020/0378841 A1* 12/2020 Hollinger ................. H01H 9/16

FOREIGN PATENT DOCUMENTS

| EP | 0834894 A2 * | 4/1998 | ............. H01H 50/46 |
|---|---|---|---|
| JP | H05157633 A | 6/1993 | |
| JP | 2021132511 A * | 9/2021 | |
| KR | 200276734 Y1 * | 5/2002 | |
| KR | 20110042779 A | 4/2011 | |
| KR | 101222139 B1 * | 1/2013 | ............. H02B 1/207 |
| KR | 20210061749 A * | 5/2021 | ........... H01R 9/2416 |
| WO | WO-2019205115 A1 * | 10/2019 | ........ H01R 13/6608 |
| WO | 2020243259 A1 | 12/2020 | |

OTHER PUBLICATIONS

Extended European Search Report dated Apr. 21, 2023 for corresponding European Patent Application No. 22213984.2-1001, 7 pages.
French Search Report and Written Opinion dated Jul. 8, 2022 for corresponding French Patent Application No. FR 2113701, 6 pages.

* cited by examiner

*Primary Examiner* — Kristina M Deherrera
*Assistant Examiner* — Evan Mancini
(74) *Attorney, Agent, or Firm* — Quinn IP Law

(57)          ABSTRACT
A thermochromic pellet for a thermochromic indicator of the heating of an electrical connection terminal of an electrical unit, is configured to change colour when its temperature exceeds a predetermined transition temperature. The thermochromic pellet is further configured to be fixed reversibly to a support limb belonging to the thermochromic indicator and fixed to the terminal.

18 Claims, 3 Drawing Sheets

THERMOCHROMIC PELLET FOR THERMOCHROMIC INDICATOR, THERMOCHROMIC INDICATOR, AND ASSOCIATED ELECTRICAL UNIT AND ELECTRICAL SWITCHBOARD

TECHNICAL FIELD

The present invention relates to a thermochromic pellet for a thermochromic indicator, to a thermochromic indicator comprising such a thermochromic pellet, to an electrical unit comprising such a thermochromic indicator and to an electrical switchboard comprising such an electrical unit.

BACKGROUND

In the field of power electrical units of an electrical installation, the electrical units are generally mounted on an electrical switchboard which is itself housed inside a casing or an electrical enclosure. Each electrical unit generally comprises at least one terminal block, to which conducting limbs such as cables or rigid rods (busbars) are connected. Each conducting limb is fixed, at one end, by means of fixings such as screws or bolts. If one of these fixings is poorly tightened, the electrical resistance of the corresponding connection increases, and when a current passes through this connection, localized heating occurs at this connection, and is a potential source of malfunctioning or even of an accident if the heating exceeds a certain threshold. For reasons of safety and/or of compliance with standards, it is therefore necessary to monitor the quality of the electrical connections, for example by monitoring the heating of these connections.

It is thus known practice to install temperature sensors within the electrical switchboard in order to continuously monitor the electrical connections, although these sensors, installing them, and exploiting their measurements, come at a high cost.

It is also known practice to use a thermal camera to capture images during inspections, in order to detect the hot spots of an electrical switchboard. However, in order to capture these images, the electrical casing housing the switchboard has to be opened, and as a safety measure, the electrical switchboard is often powered down, so that the images captured are not a faithful representation of the normal operation of the electrical units. It is not possible to delve into the service history of the electrical units between two inspections. Furthermore, opening the electrical switchboard generates air movements which have a tendency to cool the electrical units mounted on this switchboard.

The use of thermochromic indicators, which is to say of indicators configured to change colour when their temperature exceeds a predetermined threshold, is known, notably from WO-2020 243 259-A1. Each thermochromic indicator comprises a support limb in the form of a tab, which is fixed by a first end to a respective connection terminal and a second end of which is covered with an irreversible thermochromic lacquer, which is to say a lacquer that changes colour irreversibly when the temperature exceeds a predetermined threshold. A visual inspection makes it possible to remark that heating has occurred.

However, these devices have numerous disadvantages. On the one hand, when heating has occurred, the indicators that have changed colour then need to be replaced, and this involves disconnecting the corresponding connection, which takes time. In addition, each indicator is influenced by the overall temperature prevailing in the electrical casing, which leads to uncertainty as to how much heating the connection concerned has actually received. There is therefore a risk that abnormal heating might not be detected.

SUMMARY

It is these problems that the invention more particularly seeks to overcome by proposing a thermochromic indicator that is precise and practical to use.

To this end, the invention relates to a thermochromic pellet for a thermochromic indicator of the heating of an electrical connection terminal of an electrical unit, the thermochromic pellet being configured to change colour when its temperature exceeds a predetermined transition temperature.

According to the invention, the thermochromic pellet is configured to be fixed reversibly to a support limb belonging to the thermochromic indicator and fixed to the terminal.

By virtue of the invention, once an indicator has irreversibly changed colour, the user replaces only the thermochromic portion of the corresponding indicator without the need to undo the corresponding electrical connection, making it particularly practical and quick. Furthermore, depending on the application, the user may install thermochromic portions that change colour at different temperature thresholds, allowing precise oversight of the electrical connections.

According to advantageous although not compulsory aspects of the invention, such a thermochromic indicator may incorporate one or more of the following features considered in isolation or in any technically permissible combination:

- the thermochromic pellet is configured to change colour irreversibly when its temperature exceeds the transition temperature.
- The thermochromic pellet is made from an elastically deformable material incorporating thermochromic pigments, the thermochromic pellet being configured to be fixed to the support limb by elastic deformation of the thermochromic pellet.
- The material of the thermochromic pellet is a synthetic elastomer polymer material, for example a silicone material.
- The thermochromic pellet forms a cavity which is configured to collaborate, notably through complementing shapes, with an indication portion of the support limb so as to keep the thermochromic pellet assembled with the support limb.

The invention also relates to a thermochromic indicator for an electrical connection terminal, comprising the thermochromic pellet as defined hereinabove and the support limb, wherein the support limb is made from a thermally conducting material and comprises:

- a fixing portion configured to be fixed to a terminal of the electrical connection, and
- an indicating portion, different from the fixing portion and on which the thermochromic pellet is reversibly fixed.

Advantageously, the support limb is a blade of elongate shape comprising a first end forming the fixing portion and a second end, opposite to the first end, and forming the indicating portion, whereas the thermochromic pellet is fixed to the indicating portion by the sliding of the indicating portion into a cavity of the thermochromic pellet.

The invention also relates to an electrical unit, for example a switching device, comprising at least one electrical connection terminal and at least one thermochromic indicator as defined hereinabove, each thermochromic indicator being associated with a respective terminal, wherein each fixing portion is fixed to the corresponding terminal.

Advantageously:

the electrical unit comprises a cap which creates a receiving volume for receiving each thermochromic indicator, the cap being configured to reduce exchanges of heat between the receiving volume and the outside of the cap.

The electrical unit comprises a terminal block with several adjacent electrical-connection terminals, with at least one thermochromic indicator mounted on a respective terminal, whereas the cap comprises partitions which divide the internal volume into several compartments, each compartment being configured to receive a respective terminal and the associated thermochromic indicator, and to reduce the exchanges of heat between each compartment.

The cap comprises a façade made of a transparent material so that each thermochromic pellet is visible from outside the cap.

The façade is made of a synthetic polymer material, for example polycarbonate.

The invention also relates to an electrical switchboard comprising at least one electrical unit as defined hereinabove, wherein the electrical unit is fixed to a panel of the electrical switchboard.

BRIEF DESCRIPTION OF THE DRAWINGS

The invention will be better understood, and other advantages thereof will become more clearly apparent in light of the following description of one embodiment of a thermochromic pellet, of a thermochromic indicator, of an electrical unit and of an electrical switchboard which are in accordance with the principle of the invention, and which description is given purely by way of nonlimiting example with reference to the attached drawings in which.

DETAILED DESCRIPTION

Figure 1:
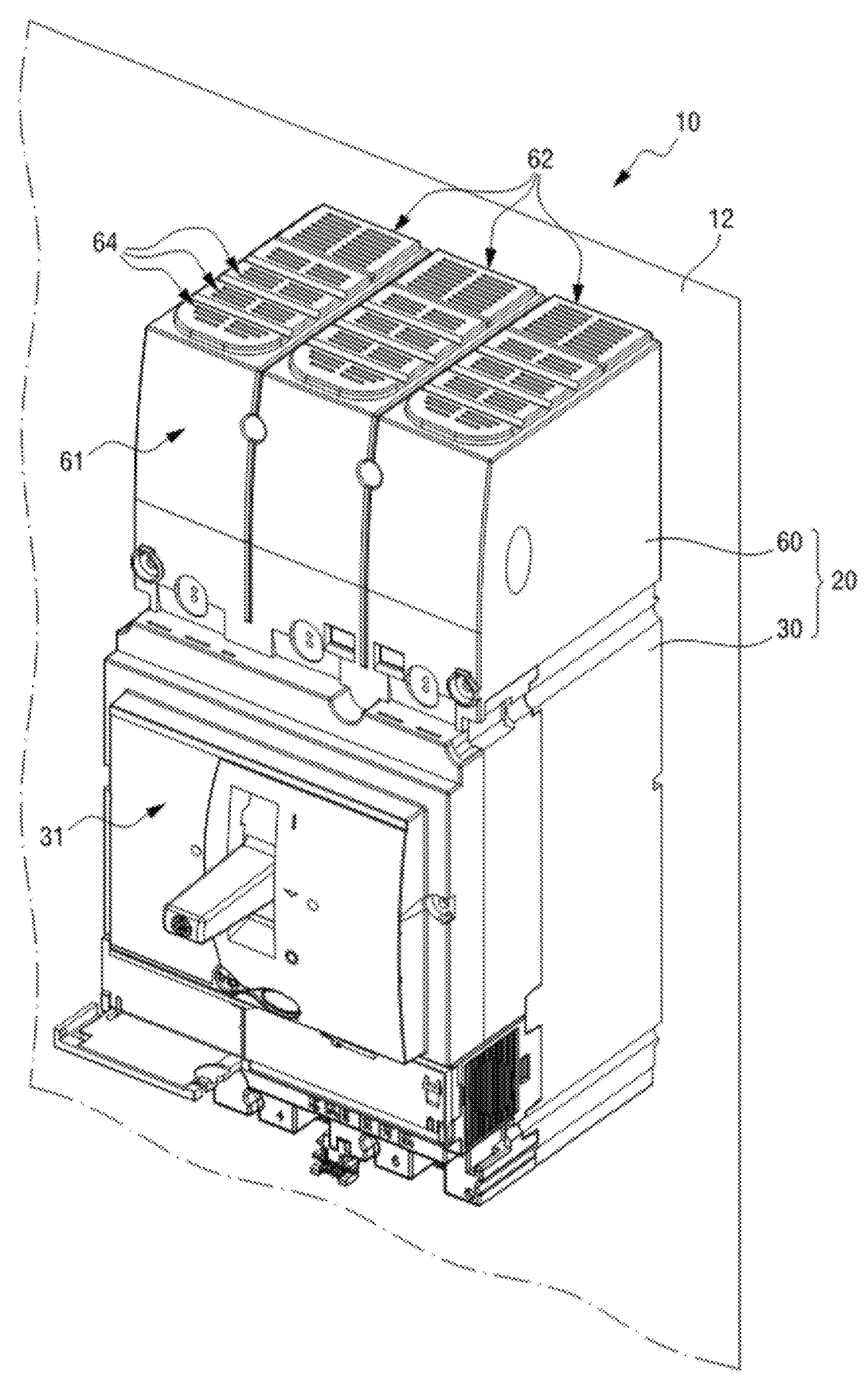
FIG. 1 is a perspective view of an electrical switchboard according to the invention, comprising an electrical unit likewise in accordance with the invention.

An electrical switchboard 10 is depicted schematically in FIG. 1. The electrical switchboard 10 is housed inside an electrical casing, or electrical enclosure. The electrical casing has not been depicted. The electrical switchboard 10 comprises a panel 12 which is considered to be planar, and which here extends vertically and has fixed to it an electrical unit 20. The description is given with reference to the orientation of the various elements as depicted in the drawings, in the knowledge that in real life these elements may be oriented differently.

The electrical unit 20 here is a switching unit, particularly a circuit breaker. In a variant which has not been depicted, the electrical unit 20 is a contactor, or else a measurement unit such as a meter, this list not being nonlimiting. The electrical unit 20 is fixed here directly to the panel 12, for example by screwing. In a variant which has not been depicted, the electrical unit 20 is fixed to the panel 12 by means of a fixing element, for example a fixing rail such as a DIN rail or equivalent.

The electrical unit 20 comprises a main casing 30, which here takes the form of a parallelepiped comprising a front face 31, facing away from the panel 12 when the electrical unit 20 is fixed to this panel 12, and an upper face 32 on which a terminal block 34 is arranged. In other words, the front face 31 faces towards a user when this user is standing in front of the panel 12 and the electrical unit 20 is fixed to this panel 12.

Figure 2:
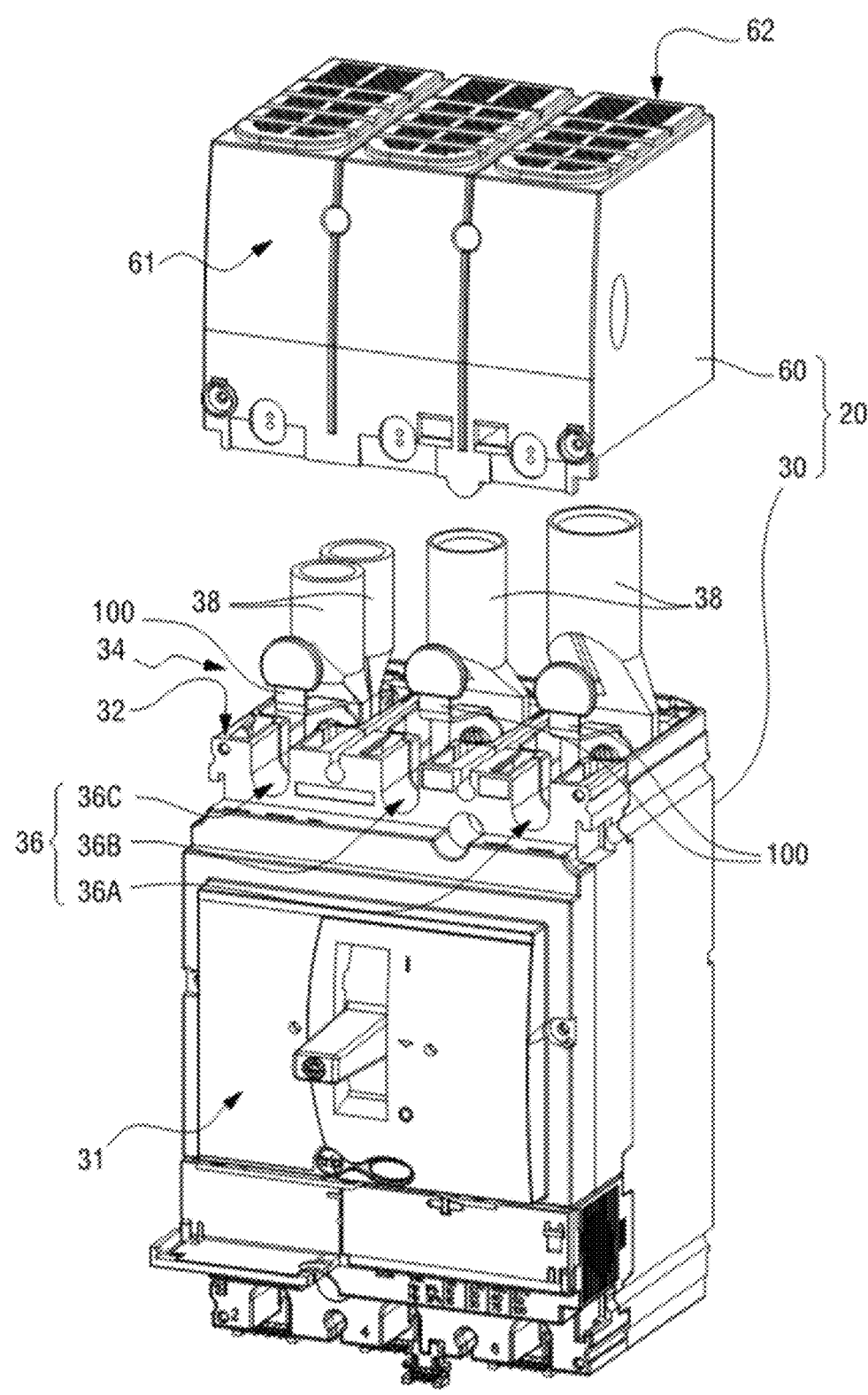
FIG. 2 is a partially exploded perspective view of the electrical unit of FIG. 1.

FIG. 1 depicts the terminal block 34 hidden by a cap 60 of the electrical unit 20, whereas in real life, as described later on, the cap 60 has a façade 61 that is transparent, allowing the terminal block 34 to be seen through the cap 60. The terminal block 34 is thus received in a receiving volume V60 of the cap 60. FIG. 2 depicts the cap 60 distanced from the main casing 30 to reveal the terminal block 34. As a preference, the cap 60 is assembled with the main casing 30 by clip-fastening, or in other words by hand and without tools. As a preference, a tool is needed to remove the cap 60 from the main casing 30, so as to prevent the cap 60 from being removed inadvertently. In a variant which has not been depicted, a tool is needed both for mounting the cap 60 on the main casing 30 and for removing the cap 60 from the main casing 30.

The façade 61 of the cap 60 faces in the same direction as the front face 31 of the main casing 30 when the cap 60 is assembled with the main casing 30. In other words, the façade 61 faces towards a user when this user is standing in front of the panel 12 on which the electrical unit 20 is fixed.

The façade 61 is advantageously made from a transparent material so that a user can see inside the cap 60. The façade 61 is made from a synthetic polymer material, for example polycarbonate. As a preference, the cap 60 is made entirely from a transparent material. As a preference, the cap 60 is made as a single piece, for example by hot forced injection. Alternatively, the cap 60 is produced by assembling parts, which are for example clip-fastened and/or bonded together.

The cap 60 also comprises an upper side 62, which here is parallel to the upper face 32 of the main casing 30 when the cap 60 is assembled with the main casing 30. The upper side 62 advantageously comprises vents 64. The vents 64 here are components attached to the rest of the cap 60 and forming slots, the vents 64 being configured to remove to outside the cap 60 some of the heat generated by the heating of the connections of the terminal block 34 when the electrical unit 20 is in use, so as to regulate the temperature prevailing in the receiving volume V60.

Figure 3:
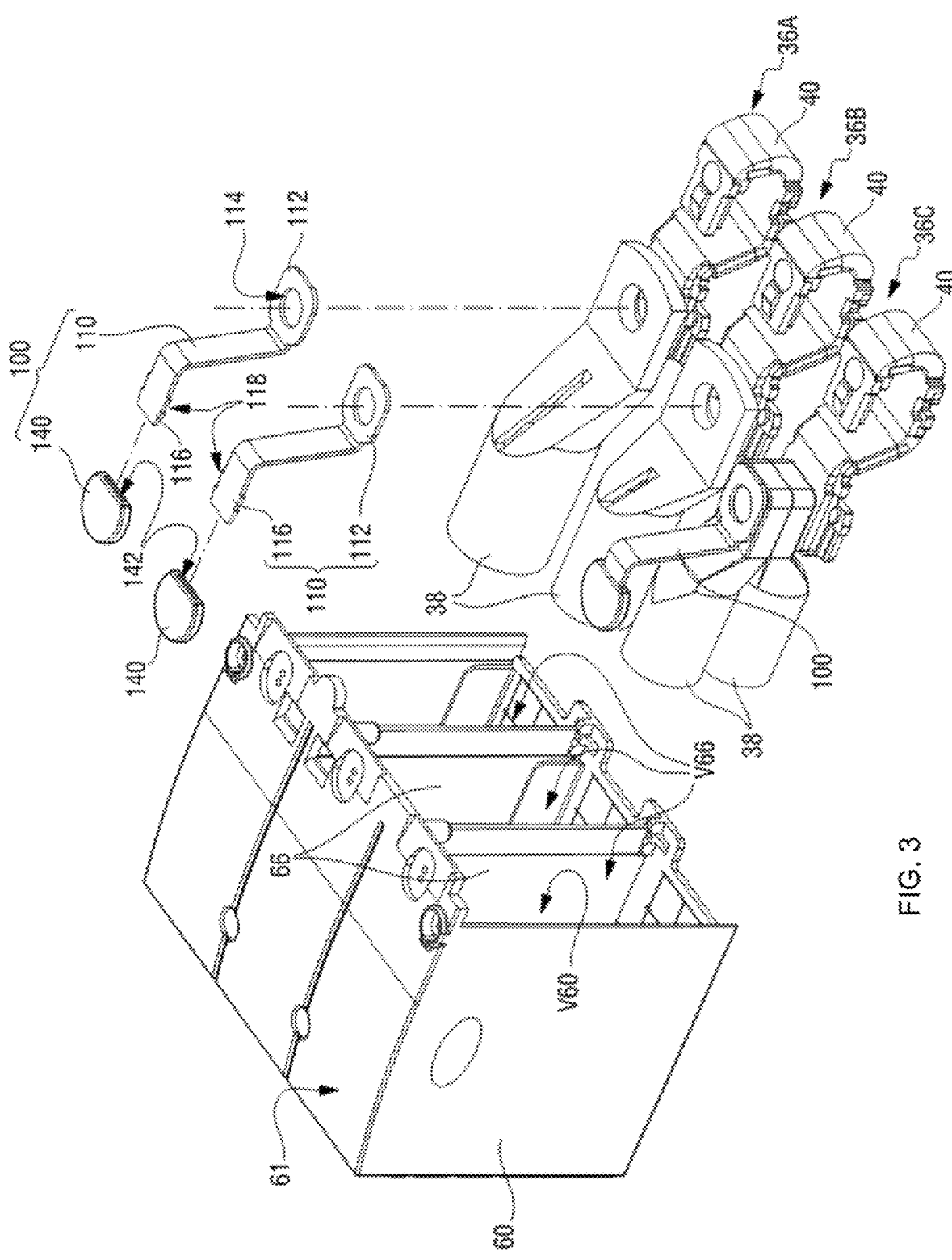
FIG. 3 is a partially exploded perspective view of certain elements of the electrical unit of FIG. 1, from another viewpoint, with some of the elements omitted.

The electrical unit 20 here is configured to be connected to a three-phase power supply, and so the terminal block 34 comprises three adjacent electrical connection terminals individually referenced 36A, 36B and 36C or referred to in general terms as terminals 36. The power supply is not depicted. In FIGS. 2 and 3, the terminal 36A is situated to the right, the terminal 36C is situated to the left, while the terminal 36B is arranged between the two other terminals 36A and 36C. The terminals 36 operate in the same way and are preferably identical, so that what is true for one of the terminals 36 can also be applied to the other terminals 36.

In a variant which has not been depicted, the terminal block 34 comprises a different number of terminals 36, for example two adjacent terminals 36 if the electrical unit 20 is configured to be connected to a two-phase power supply. More generally, each terminal 36 of the terminal block 34 is associated with one electrical phase of the power supply.

The terminals 36 are connected to electrical conductors, depicted here as terminal clips 38, each terminal clip 38 being configured to be crimped onto a respective end of an electrical conductor. The terminal clamps 38 do not form part of the electrical unit 20 but serve to specify the context of the invention. In the example illustrated, the terminal clamps 38 fixed to each of the terminals 36A, 36B and 36C are of different sizes. In particular, the terminal 36C here is fixed to two terminal clamps 38.

For each terminal 36, the electrical unit 20 comprises a respective conducting limb 40, which is partially housed inside the main casing 30 and which is configured to be connected to the terminal clamps 38 outside of the main casing 30. Only the conducting limbs 40 are depicted in FIG. 3, the rest of the main casing 30 not being depicted. In the example illustrated, the terminal clamps 38 are assembled with the corresponding conducting limb 40 by means of fixing members, for example screws or bolts. The fixing members have not been depicted.

At each terminal 36, the corresponding electrical connection has a certain electrical resistance and naturally heats up when an electric current passes through this connection. When the electrical connection enters a conducting limb 40 and the terminal clamp or clamps 38 prove to be defective, for example when the corresponding fixings have been incorrectly tightened, the apparent electric resistance of the corresponding terminal 36 increases. If an electrical current is passing through this terminal 36, localized heating at this terminal 36 occurs. As a safety measure, it is appropriate to monitor this heating, and in particular it is appropriate to monitor whether such heating exceeds a predetermined temperature threshold, the temperature threshold being chosen by the user according to the safety constraints governing that application, notably according to constraints set out in standards; for example, Standard IEC 60947-2: 2016, and its 2019 amendment, requires that heating of electrical connections beyond 120° C. be monitored.

In order to monitor this heating, the electrical unit 20 comprises thermochromic indicators 100.

Each thermochromic indicator 100 is associated with a respective terminal 36. Thus, the electrical unit 20 illustrated in this example here comprises three thermochromic indicators 100. The thermochromic indicators 100 all operate in the same way and are preferably identical to one another. What is true for one of the thermochromic indicators 100 can be applied to the other thermochromic indicators 100. As a variant which has not been depicted, just part of the terminals 36 is equipped with a thermochromic indicator 100.

Each thermochromic indicator 100 comprises a support limb 110 to which a thermochromic pellet 140 is fixed. Each thermochromic pellet 140 is configured to be fixed reversibly to the corresponding support limb 110. What is meant by "reversibly" is that a user can fix a thermochromic pellet 140 to the corresponding support limb 110 and then remove this thermochromic pellet 140 from this support limb 110 without damaging either the thermochromic pellet 140 or the support limb 110.

Each thermochromic pellet 140 is made from a thermochromic material. What is meant by thermochromic material is a material of which the colour, visible to a human being, changes when the temperature of this material exceeds a predetermined transition temperature. The transition temperature is chosen to be far higher than the ambient temperature prevailing in an electrical housing. Typically, the ambient temperature is comprised between 0° C. and 60° C., while the transition temperature is higher than 80° C.

Such a thermochromic material is produced here by dispersing a thermochromic pigment, preferably in the form of powder, in a transparent or translucent matrix. Each thermochromic pigment is therefore characterized by a predetermined transition temperature specific to that pigment, in terms of original colour, when the pigment is maintained at ambient temperature, and in terms of its so-called "activated colour" once the transition temperature has been exceeded.

Depending on the application, a thermochromic pigment changes colour reversibly, which is to say that this pigment returns to its original colour when the temperature drops back down below the transition temperature, or else irreversibly, which is to say that once the temperature of the pigment has exceeded the transition temperature, then the colour of the pigment remains the activated colour.

The matrix of the thermochromic pellet 140 is advantageously a synthetic elastomer polymer material. The matrix of the thermochromic pellet 140 is, for example, a thermoplastic polymer material. The thermochromic pellet 140 is advantageously manufactured by hot forced injection. When the chosen thermochromic pigments are irreversible, the glass transition temperature of this thermoplastic material is chosen to be well below the transition temperature for the thermochromic pigment concerned. What is meant by "well below" is, for example, that the melting point is 20° C. below the transition temperature of the thermochromic pigment.

Alternatively, the matrix of the thermochromic pellet 140 is a thermosetting polymer material, preferably that can be polymerized at a temperature well below the transition temperature of the thermochromic pigments.

In the example illustrated, the matrix of the thermochromic pellets 140 is polysiloxane, also known as silicone, which is designed to polymerize at temperatures below the order of 80° C., while the transition temperature for the thermochromic pigments is of the order of 110° C.

It is thus possible to mix several thermochromic pigments so as to obtain a blend that has a number of transition temperatures, with an apparent colour that is the result of the colour, at the temperature concerned, of each of the pigments that make up the blend and of the relative proportions of each pigment in the blend. It is of course possible to blend pigments which change colour reversibly with pigments that change colour irreversibly.

In the example illustrated, the thermochromic material has just one transition temperature, at 110° C.

The support limb 110 is made from a thermally conducting material, preferably a metal or a metal alloy, more preferably still a metal or a metal alloy that does not rust. The support limb 110 is for example made of copper or one of the alloys thereof, or else of aluminium or one of the alloys thereof.

The support limb 110 here is a blade, that has an elongate shape with two opposite ends. At one of its two ends, the support limb 110 comprises a fixing portion 112 which is configured to be fixed to the corresponding terminal 36. The fixing portion 112 here comprises a bore 114 configured to collaborate with the fixing member used to fix the terminal clamp or clamps 38 to the corresponding conducting limb 40.

At the other of its two ends, the support limb 110 comprises an indicating portion 116 configured to receive, reversibly, one exemplar of a thermochromic pellet 140. In other words, the indicating portion 116 is different from the fixing portion 112, each thermochromic pellet 140 being configured to be fixed reversibly to the corresponding indicating portion 116.

The thermochromic pellet 140 is configured to be fixed to the support limb 110 by elastic deformation of the thermochromic pellet 140. In the example illustrated, the indicating portion 116 has the form of a tab with lugs 118, while the thermochromic pellet 140 forms a receiving cavity 142 for receiving the indicating portion 116, the cavity 142 having a shape that complements the indicating portion 116. This then ensures that there is enough area of contact between the thermochromic pellet 140 and the indicating portion 116 that a temperature of the thermochromic pellet 140 and a temperature of the indicating portion 116 on which this thermochromic pellet 140 is fixed can be considered to be equal.

The thermochromic pellet 140 is mounted on the corresponding support limb 110 by sliding the indicating portion 116 into the cavity 142, the elastic deformation of the thermochromic pellet 140 accommodating the insertion of the lugs 118. This way of mounting the thermochromic pellet 140 on the corresponding support limb 110 is particularly simple and quick.

The thermochromic pellet 140 is then kept assembled with the support limb 110 through the complementing shapes of the thermochromic pellet 140 with the support limb 110. In the example illustrated, the lugs 118 collaborate with the cavity 142, through complementing shapes, to keep the thermochromic pellet 140 assembled with the support limb 110.

For example, the receiving cavity 142 has an oblong shape with rectangular cross section, so as to allow the distal end of the indicating portion 116 to be inserted. The receiving cavity 142 also has deformable internal narrowings which are configured to collaborate with the lugs 118, for example in order to prevent accidental removal of the indicating portion 116 from the cavity 142 of the pellet 140.

When removing a thermochromic pellet 140 from the indicating portion 116, the user simply pulls on this thermochromic pellet 140 by hand and without using a tool, in order to pull the indicating portion 116 out of the cavity 142, the thermochromic pellet 140 deforming elastically in order to accommodate the passing of the lugs 118. The user may then fit a new thermochromic pellet 140 of their choice, whether this be a thermochromic pellet 140 of the same type or of a different type from the previous thermochromic pellet. Such a thermochromic indicator 100 is thus particularly practical to use.

The support limb 110 is arranged, relative to the terminal clamps 38, on the opposite side of the conducting limb 40. In other words, the support limb 110 is situated towards the front of the casing 30 by comparison with the terminal clamps 38, so that each thermochromic pellet 140 mounted on the corresponding indicating portion 116 is situated on the side of the front face 31 of the main casing 30. Thus, when the electrical unit 20 is fixed to the panel 12, each thermochromic pellet 140 is visible to a user facing the panel 12. When the cap 60 is mounted on the main casing 30, each thermochromic pellet 140 is visible from outside the cap 60, through the transparent façade 61. For each thermochromic indicator 100, the fixing portion 112 and the indicating portion 116 are distant from one another so as to accommodate the fitting of several types of terminal clamps 38 and facilitate access to the indicating portion 116, for example for replacing the corresponding thermochromic indicator 100.

When the electrical unit 30 is in use, the passage of electrical current causes each terminal 36 to heat up. The heat of each terminal 36 is transmitted, via each support limb 110, from the fixing portion 112 to the corresponding thermochromic pellet 140. Some of this heat transmitted by the support limb is dissipated, for example by radiation, or else because of convective movements of the surrounding air, which means that the temperature of the indicating portion 116, and therefore of the thermochromic pellet 110, is lower than the temperature of the fixing portion 112.

The cap 60 is advantageously configured to reduce air movements that tend to cool the thermochromic indicators 100, or in other words to reduce the exchanges of heat between the receiving volume V60 and the outside of the cap 60. In the example illustrated, when the temperature of the fixing portion 112 is of the order of 120° C. and the temperature of the surrounding air is 40° C., in the absence of a cap 60, the temperature of the indicating portion 116 is of the order of 80° C. whereas when the cap 60 is present, the temperature of the indicating portion 116 is of the order of 110° C., which corresponds to the transition temperature of the chosen thermochromic pigments. The influence of the temperature of the surrounding air is reduced, enabling more precise indication by each thermochromic indicator 100.

The cap 60 advantageously comprises partitions 66 which divide the receiving volume V60 into compartments V66. Each compartment V66 is configured to receive a respective terminal 36 and the thermochromic indicator 100 associated with this terminal 36. Thus, when the cap 60 is assembled with the main casing 30, each terminal 36 and the associated thermochromic indicator 100 are separated from the other terminals 36 and associated thermochromic indicators 100. The exchanges of heat between each of the compartments V66, particularly convective heat exchanges, are thus reduced. In other words, the influence that each terminal 36 has on the thermochromic indicators 100 mounted on the other terminals 36 is reduced, allowing more precise indication by each thermochromic indicator 100.

In the example illustrated, the partitions 66 are manufactured with the rest of the cap 60, in a single step, for example by forced hot injection. Alternatively, the partitions 66 are parts that are added to the rest of the cap 60, the partitions 66 being, for example, assembled with the rest of the cap 60 by clip-fastening and/or bonding.

Any feature described in the foregoing with reference to one embodiment or variant can be employed for the other embodiments and variants described hereinabove, provided that this is technically feasible.

The invention claimed is:

1. An electrical unit comprising:
one or more electrical connection terminals;
one or more thermochromic indicators, each of the thermochromic indicators being associated with a respective terminal from the one or more electrical connection terminals, each of the thermochromic indicators respectively comprising:
a thermochromic pellet configured to change color when a temperature of the thermochromic pellet exceeds a predetermined transition temperature; and
a support limb formed from a thermally conductive material, the support limb including:
a fixing portion fixed to the respective terminal; and
an indicating portion distinct from the fixing portion, the indicating portion having one or more protrusions; and
wherein the thermochromic pellet includes a cavity configured to engage with the one or more protrusions of the indicating portion, the thermochromic pellet being configured to be reversibly attached to the indicating portion.

2. The electrical unit according to claim 1, further comprising:
a cap defining a receiving volume for respectively receiving each of the thermochromic indicators, the cap being configured to reduce exchanges of heat between the receiving volume and an exterior of the cap.

3. The electrical unit according to claim 2, wherein:

the electrical unit comprises a terminal block having a plurality of adjacent electrical connection terminals, with each of the thermochromic indicators mounted on the respective terminal, and the cap includes partitions which divide an internal volume of the cap into several compartments, each of the compartments being configured:

to receive the respective terminal and a corresponding one of the thermochromic indicators, and to reduce the exchanges of heat between each of the compartments.

4. The electrical unit according to claim 2, wherein the cap comprises a facade made of a transparent material so that the thermochromic pellet is visible from outside the cap.

5. The electrical unit according to claim 4, wherein the facade is made of a synthetic polymer material.

6. An electrical switchboard comprising:

at least one electrical unit according to claim 1; and a panel, wherein the electrical unit is fixed to the panel of the electrical switchboard.

7. The electrical unit according to claim 1, wherein:

the cavity has a shape complementary to the indicating portion, the thermochromic pellet being elastically deformable; and the thermochromic pellet is configured to be reversibly fixed to the support limb by elastic deformation of the thermochromic pellet.

8. The electrical unit according to claim 7, wherein the cavity includes deformable internal narrow structures configured to collaborate with the indicating portion to prevent accidental removal of the indicating portion from the cavity.

9. The electrical unit according to claim 1, wherein the thermochromic pellet is composed entirely of thermochromic pigments.

10. The electrical unit according to claim 1, wherein the thermochromic pellet comprises a synthetic elastomer polymer material.

11. The electrical unit according to claim 1, wherein:

the support limb is a blade of elongate shape comprising a first end forming the fixing portion and a second end forming the indicating portion, the second end being opposite to the first end; and the thermochromic pellet is attached to the indicating portion by sliding the indicating portion into the cavity of the thermochromic pellet.

12. The electrical unit according to claim 1, wherein the thermochromic pellet is configured to change color irreversibly when a temperature of the thermochromic pellet exceeds the predetermined transition temperature.

13. A thermochromic indicator for an electrical connection terminal, comprising:

a thermochromic pellet configured to change color when its temperature exceeds a predetermined transition temperature,; and a support limb formed from a thermally conductive material, the support limb comprising:

a fixing portion arranged to be fixed in heat-conductive contact with the electrical connection terminal; and an indicating portion distinct from the fixing portion, the indicating portion having one or more protrusions;

wherein the thermochromic pellet comprises a self-supporting solid body with a cavity configured to engage with the protrusions of the indicating portion, the thermochromic pellet being reversibly attached to the indicating portion.

14. The thermochromic indicator according to claim 13, wherein:

the cavity has a shape complementary to the indicating portion, the thermochromic pellet being elastically deformable; and the thermochromic pellet is configured to be reversibly fixed to the support limb by elastic deformation of the thermochromic pellet.

15. The thermochromic indicator according to claim 14, wherein the cavity includes deformable internal narrow structures configured to collaborate with the indicating portion to prevent accidental removal of the indicating portion from the cavity.

16. The thermochromic indicator according to claim 13, wherein the thermochromic pellet is composed entirely of thermochromic pigments.

17. The thermochromic indicator according to claim 13, wherein:

the support limb is a blade of elongate shape comprising a first end forming the fixing portion and a second end forming the indicating portion, the second end being opposite to the first end; and the thermochromic pellet is fixed to the indicating portion by sliding of the indicating portion into the cavity of the thermochromic pellet.

18. The thermochromic indicator according to claim 13, wherein the thermochromic pellet comprises a synthetic elastomer polymer material.

\* \* \* \* \*